United States Patent
Steijer et al.

[19]

[11] Patent Number: 5,818,990
[45] Date of Patent: Oct. 6, 1998

[54] ENCAPSULATION OF OPTOELECTRONIC COMPONENTS

[75] Inventors: Odd Steijer, Bromma; Paul Eriksen, Tyresö; Hans Moll, Enskede; Jan Åke Engstrand, Trångsund; Göran Palmskog, Järfälla; Mats Janson, Täby; Pia Tinghag, Bromma, all of Sweden

[73] Assignee: Telefonaktiebolaget LM Ericsson

[21] Appl. No.: 722,119

[22] PCT Filed: Mar. 20, 1995

[86] PCT No.: PCT/SE95/00281

§ 371 Date: Jan. 28, 1997

§ 102(e) Date: Jan. 28, 1997

[87] PCT Pub. No.: WO95/25974

PCT Pub. Date: Sep. 28, 1995

[30] Foreign Application Priority Data

Mar. 18, 1994 [SE] Sweden .................................. 9400907

[51] Int. Cl.⁶ ............................................. G02B 6/36
[52] U.S. Cl. ................................ 385/49; 385/14; 385/89; 385/83
[58] Field of Search .................. 385/88–94, 14, 385/49, 83, 65

[56] References Cited

U.S. PATENT DOCUMENTS

| | | | |
|---|---|---|---|
| 4,170,399 | 10/1979 | Hansen et al. | 350/96.2 |
| 5,059,475 | 10/1991 | Sun et al. | 385/14 |
| 5,076,654 | 12/1991 | Presby | 385/129 |
| 5,077,878 | 1/1992 | Armiento et al. | 437/906 |
| 5,091,045 | 2/1992 | Froning et al. | 216/24 |
| 5,155,777 | 10/1992 | Angelopoulos et al. | 385/14 |
| 5,163,108 | 11/1992 | Armieto et al. | 385/89 |
| 5,454,055 | 9/1995 | Kragl et al. | 385/14 |
| 5,562,838 | 10/1996 | Woinarowski et al. | 385/14 |

FOREIGN PATENT DOCUMENTS

| | | |
|---|---|---|
| 0 171 615 | 2/1986 | European Pat. Off. . |
| 0 226 296 | 6/1987 | European Pat. Off. . |
| 0 313 956 | 9/1989 | European Pat. Off. . |
| 0 331 338 | 9/1989 | European Pat. Off. . |
| 0 571 924 | 12/1993 | European Pat. Off. . |
| 3928 894 | 3/1991 | Germany . |

*Primary Examiner*—John Ngo
*Attorney, Agent, or Firm*—Burns, Doane, Swecker & Mathis, L.L.P.

[57] ABSTRACT

An encapsulated optocomponent (1) comprises a single-crystal silicon wafer (3) and waveguides (9) located thereon, which at least partly are manufactured by means of process methods taken from the methods for manufacturing electronic integrated circuits. The waveguides (9) extend from an edge of the optoelectronic component (1) to an optoelectronic, active or passive component (11) attached to the surface of the silicon wafer (3). Over the region for connecting the waveguides (9) to the optoelectronic component (11) a transparent plastics material is molded (17), for instance an elastomer, having a refractive index adjusted to improve the optical coupling between the waveguides (9) and the optoelectronic component (11). The molding (17) covers advantageously all of said component (11) to also reduce thermal stresses between it and an exterior, protective layer (19) of a curable plastics material. The molded layer (17) can also cover the whole area of the waveguides (9) to form an upper cladding thereof. Guide grooves (5) are arranged in the silicon wafer (3) for positioning guide pins (7), utilized in the connection of the optocomponent (1) to another optocomponent having guides for guide pins and waveguides configured in the same way.

18 Claims, 3 Drawing Sheets

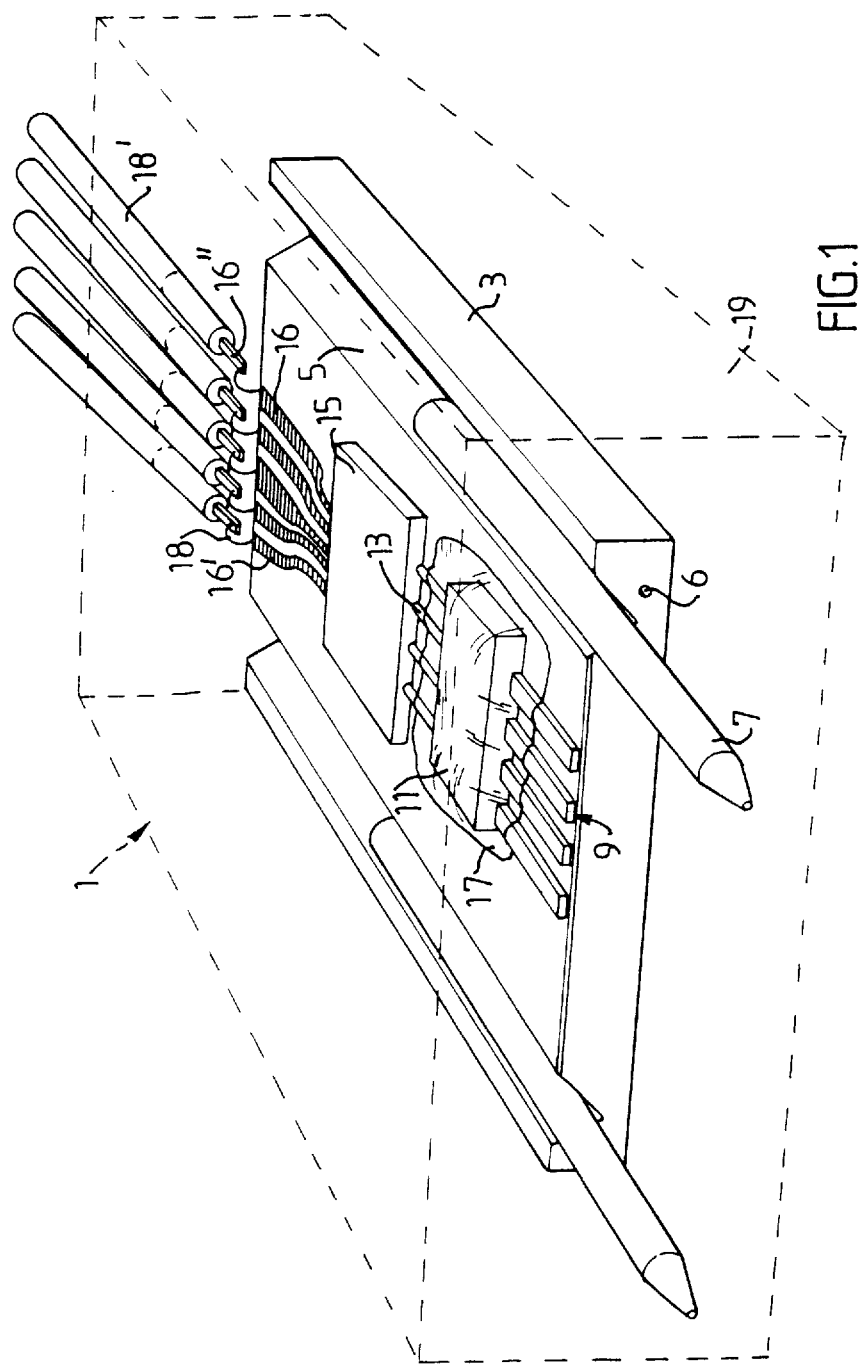

ENCAPSULATION OF OPTOELECTRONIC COMPONENTS

TECHNICAL FIELD

The present invention relates to methods for producing encapsulated optocomponents comprising waveguides and optoelectronic devices arranged on a substrate such as a silicon substrate and it also relates to the encapsulated optocomponents and components therein.

BACKGROUND

Encapsulated optocomponents comprising associated waveguides, connectors, etc., are costly and these costs form an obstacle to the general introduction of the optical communication technique. One of the main reasons of the high component cost is the high requirements of mechanical precision in an alignment of an optoelectronic component with waveguides and of waveguides in one component with another waveguide. This fact results in that various costly fine mechanical details must be used. The assembly also requires a considerable time and is therefore costly. In addition, the conventional components are encapsulated hermetically or impermeably against diffusion, what gives further requirements on the encapsulating method and on the included materials (processing in an inert atmosphere, relatively high temperatures and similar factors). If more rational alignment methods, encapsulation methods which do not have to provide entirely the same high degree of impermeability and less costly materials were available, the production cost per encapsulated component could be reduced significantly.

PRIOR ART

U.S. patents U.S. Pat. No. 5,077,878 and U.S. Pat. No. 5,163,108 for Armiento et al. disclose how optical receiving elements such as fibers are aligned to active elements of a light generating chip by forming pedestals or projections on the surface of a substrate body, preferably of silicon. The optical fibers are positioned in V-grooves in the surface of the substrate and are fabricated by photolithographic techniques.

Aligning methods for components on a Si substrate are also disclosed in the European published patent application EP-A1 0 571 924, where guide grooves for guide pins are used. Waveguides having rectangular cores are made by deposition on a Si substrate.

According to the German patent application DE-A1 39 28 894 (which corresponds to U.S. Pat. No. 5,091,045) which is made available to the public, the connection region between an electrooptical component and waveguides is covered by molding a hardening or stiffening material having a refractive index adapted to that of the waveguides.

An alignment procedure is also disclosed in the European published patent application EP-A1 0 226 296.

In the European published patent application EP-A2 0 171 615 a hybrid optical integrated circuit is disclosed having various "islands" on a silicon substrate for positioning various devices and waveguides formed integrally in the surface of the substrate.

From the European published patent application EP-A2 0 313 956 it is previously known, in encapsulating an optoelectronic component, to mount it on a metal substrate and mold the assembly thus formed entirely in non transparent plastics 6 (FIGS. 1, 5a, and 5b). Interfaces between fiber ends in the component and a component formed by a photo or laser diode can before that be molded in transparent plastics (column 5, lines 6–16).

SUMMARY

It is an object of the invention to provide optical components comprising a cost efficient encapsulating of particularly sensitive places at the connection of component and waveguide.

It is a further object of the invention to provide encapsulated optical components comprising waveguides which are produced in a simple way for coupling optical signals to and from another component.

It is a further object of the invention to provide encapsulated optical components having accurately produced guides for guide pins at a contact surface of the components to other components having a contact surface formed in a similar way and also to other guides for an accurate positioning of discrete waveguides and discrete components.

It is a further object of the invention to provide relatively simple and not very costly methods for producing encapsulated optical components having optical interfaces to other similar components.

These objects are achieved by the invention, the characteristics of which are set out in the appended claims.

An encapsulation comprising an accurate positioning of mechanical components is made by the method that waveguides, an optocomponent and possible electronic circuits first are produced and/or are assembled on a substrate of for instance silicon having guide grooves made accurately thereon. The optocomponent and the interface between it and the waveguide or even the entire unit are then covered by molding an elastic material transparent to the present wavelength in order to ensure an optical contact and prevent penetration of plastics. After that the injection molding of the plastics capsule is made.

In the production of an encapsulated optocomponent first a plate of a suitable anorganic material is produced, preferably a single-crystal silicon wafer but also ceramic plates and other plates of this type may be used, which generally are rather brittle and do not allow to be subjected to large mechanical stresses. Hereinafter primarily a substrate in the shape of a silicon wafer will be discussed. Then various devices in and on the surface of the plate are fabricated by means of process technological methods of the kind used in the manufacture of electronic integrated circuits, such as by deposition, diffusion, oxidation, applying masks of photoresist material, lithographic patterning, etching, other chemical processing and equivalent methods. The term "process technological methods" will hereinafter indicate methods of the mentioned kind. By these methods layers and devices are obtained which are made directly in the plate and are integrated therewith. Thus lower cladding regions and thereupon core regions can be obtained for waveguides and possibly also finally upper cladding regions. An optoelectronic component can be attached to the same surface of the substrate plate to be optically coupled to the waveguides and this component is also connected electrically to respective electric terminals such as conductive areas also made in and on the surface of the plate. The upper cladding regions can be produced by covering at least a portion of the surface of the substrate plate comprising at least part of the free surface of the lower cladding regions and at least part of the free surface of the core regions, for instance a covering by molding of a soft, elastic plastics material such as an elastomer material.

In the production of the waveguides thus first a lower portion of a cladding or the claddings can be produced by the method that a layer or several layers are introduced or coated over a suitable area of the surface of the plate which can comprise one or several elongated and strip shaped areas, and thereafter the core regions are made by introducing or coating an additional layer having an elongated shape on top of or in the surface of the layer or layers respectively forming the lower portion of the cladding or claddings. The production of the layers is made by means of process technological methods common within the field of manufacturing electronic integrated circuits. Thereafter at least the connection or interface region between an optoelectronic component and preferably all waveguides is covered or coated with a plastics material.

The plastics material is advantageously a transparent material having a refractive index adapted to enhance the optical coupling, that is the coupling of light, between the optoelectric component and the waveguides.

On top of at least the area of the substrate plate surface comprising the mentioned devices including the free surfaces of the cladding or claddings respectively and in particular the free surfaces of the elastic plastics material an additional mechanically resistant, hard, opaque plastics layer is coated such as by transfer molding or injection molding in order to protect the assembly mechanically and optically.

In the plate accurately aligned guide grooves can be produced by etching, for instance anisotropical etching in the case where the plate is of single-crystal type, for positioning alignment devices and/or optical fibers acting as waveguides. Bosses (mesas) or similar projections can be produced by methods according to the above, for instance deposition, for positioning devices such as discrete devices arranged on the surface of the plate, for instance the optoelectric component.

The alignment devices are required when the optocomponent comprises an optical connector means for connecting the optocomponent to a device having a corresponding optical connector or optical interface. The alignment devices can be cylindrical guide pins and such pins or devices having at least partly the same shape as they are then advantageously placed in the corresponding guide grooves on the surface of the substrate plate before the transfer molding or injection molding of the protective plastics layer.

The substrate plate can have a substantially rectangular shape comprising in any case a straight front edge and a flat front surface. For an optocomponent comprising an optical contact possibility to a component formed similarly there are then two parallel guide grooves for guide pins which extend on the top surface of the plate perpendicularly to the front surface and in the case where the silicon plate has a rectangular shape, in the neighbourhood of and in parallel with two opposite edges thereof, which then are perpendicular to the front surface.

BRIEF DESCRIPTION OF THE DRAWINGS

The invention will now be described in more detail with reference to non-limiting embodiments and with reference to the accompanying drawings in which:

FIG. 1 is a schematic perspective view of an optoelectronic capsule comprising an optical connector means.

DETAILED DESCRIPTION

Figure 2A:
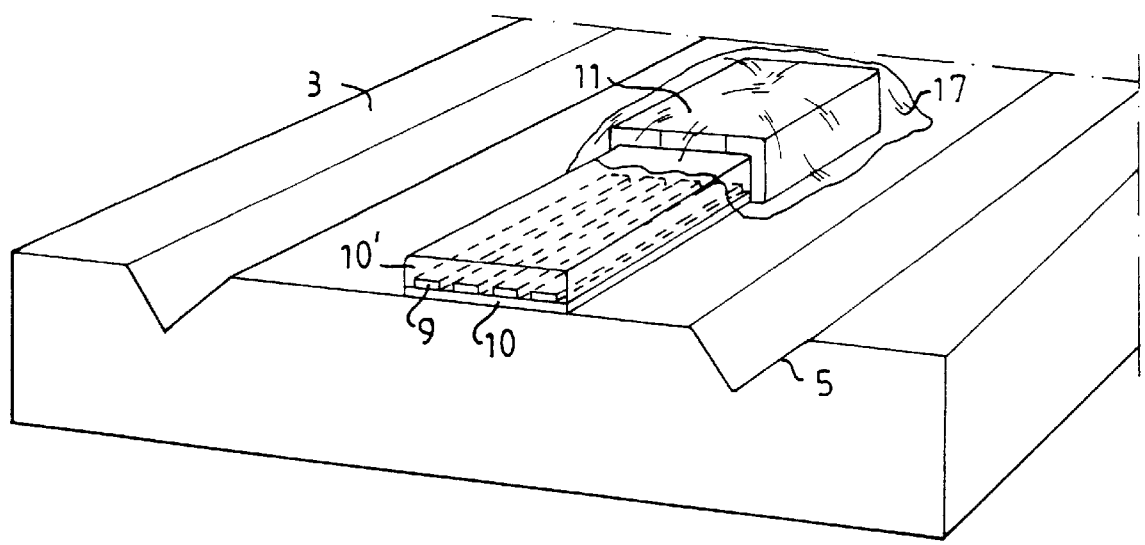
FIG. 2a is a perspective view of a segment of a substrate comprising an interior encapsulation of a component arranged thereupon and waveguides produced directly on the surface of the substrate.

FIG. 1 is perspective view of an encapsulated optoelectronic unit or optocapsule 1, the base part of which is a substrate 3. The substrate 3 is in the preferred case a single-crystal silicon plate comprising therein and thereupon devices which are produced in various ways and are integrated with the plate, for guiding light and for positioning various devices. These various devices are made by means of methods common within the process technology for manufacturing integrated microelectronic circuits and micro-mechanical devices. The silicon substrate 3 has generally the shape of a rectangular wafer comprising guide grooves 5 which extend along two opposite edges and are perpendicular to a front edge or a flat front surface 6 of the substrate. The guide grooves 5 have a cross section which in the illustrated embodiment is shaped as a symmetrical angle and the sides of which form an angle comprising about 45°–650° to the top surface of the silicon substrate 3. The guide grooves 5 act as guides for two cylindrical guide pins 7 which can be extractable and insertable as in conventional MT connectors.

Further, on the silicon plate waveguides 9 are arranged which are located centrally between the guide grooves 5 which are parallel to each other and which also are parallel to them. The waveguides 9 extend up to the front edge 6 of the silicon plate 3, in order to be capable of guiding light at this edge to and from another optocapsule or optocomponent (not shown), which at its front side is shaped in a complimentary or corresponding manner and which is intended to be placed at the optocomponent 1 and to be guided in a correct position by the guide pins 7.

The other ends of the waveguides 9 are connected to an optoelectronic, active or passive component 11, for instance it also being a plate which is produced in one piece by methods used within the process technology for manufacturing electronic integrated circuits and which is attached to the silicon base 3. From the optoelectronic component 11 electric conductors 13 extend to driver electronic circuits in the shape of a unit 15, which is also attached to the top surface of the silicon substrate 3. The driver electronic circuit unit 15 is electrically connected to conductive paths 16 comprising suitable contact areas 16', to which conductive wires 18 are soldered for connection to contact pins 16" of exterior electrical cables 18'.

For production of the encapsulated optocomponent 1 first a silicon substrate according to FIG. 1 comprising guide grooves 5 and the waveguides 9 is produced. The guide grooves 5 can be obtained by means of a temporarily deposited mask of type photo resist and some etching method, for instance anisotropical etching. The waveguides 9 can comprise organic polymer material or preferably anorganic material. They can at least partly be manufactured by means of methods common within the process technology for processing silicon substrates in order to produce integrated electronic circuits and micromechanical elements, such as oxidation, deposition, diffusion, patterning, etching, etc. The driver electronic circuit unit 15 and the optoelectric component 11 are positioned at their places and are connected to each other by means of the electrical wires 13. The driver electronic circuit unit 15 is connected to the conductive paths 16.

In order to achieve a good optical coupling between the waveguides 9 and the optoelectronic component 11 the connection region therebetween, preferably also comprising the whole optoelectronic component 11, is covered by molding a layer of a suitable transparent synthetic material 17 such as a plastics material, in particular an elastomer, having a suitable refractive index.

In the guide grooves 5 on the silicon base plate 3 the guide pins 7 are placed or possibly other devices having the same shape as the guide pins in the region where they extend inside the optocomponent 1. The conductive wires 18' are connected to the contact areas 16'. Finally the assembly formed in this way is covered by molding all around with a suitable, preferably darkly coloured or opaque, mechanically resistant material 19 in the same way as in encapsulating conventional integrated electronic circuits, for instance with a curable resin material and by transfer molding thereof (such as injection molding of type "Reaction Injection Molding"), low pressure injection molding, for instance of a suitable thermoplastics material, etc. In this molding operation at least all of the region of the top surface of the silicon substrate 3 is covered, where the guide grooves, the waveguides, the optocomponent and preferably also the driver electronic circuit unit 15 and its electrical connections are located. Advantageously the whole silicon substrate 3 is covered by molding including its various devices except the front surface 6, where the guide grooves 5 for the guide pins and where a connection to an optical unit having a complimentary shape is to be made for coupling optical signals.

The transparent plastics material 17 also acts as a stress-relieving material and can accommodate thermally created mechanical stresses between the plastics capsule 19 and the optoelectronic component 11, both when molding into the capsule 19 and later, in the real use or the operation of the encapsulated component 1. The plastics material 17 should therefore be soft and elastic and can advantageously be a suitably selected elastic material.

FIG. 2a is a perspective view of the front portion of the silicon substrate 3 in an embodiment where the waveguides are formed of waveguide cores 9 having a rectangular cross section and a cladding surrounding the cores and formed of a layer 10 directly arranged on the surface of the silicon substrate and a top layer 10' located at the sides of and on top of the cores 9'. The waveguide cores 9' and the lower and upper cladding portions 10 and 10' can be manufactured by means of different process technological methods according to above, such as by deposition or similar methods of suitable materials on, oxidation of the surface of a silicon substrate 3, doping, patterning or masking, etching, etc., to produce layers having suitable refractive indices. The transparent plastics material 17 is arranged on top of the optoelectronic component 11 and over the connection region between the optoelectric component 11 and the waveguides formed by the cores 9' and the cladding portions 10 and 10'. An encapsulation is finally made as above comprising molding into a protective, mechanically resistant material.

The waveguide portions 9', 10 and 10' can also in special cases be made of a suitable polymer material, for instance a polyimide, and are then produced by extruding polymer layers on the surface of the plate 3 and by patterning the layers after that.

Figure 2B:
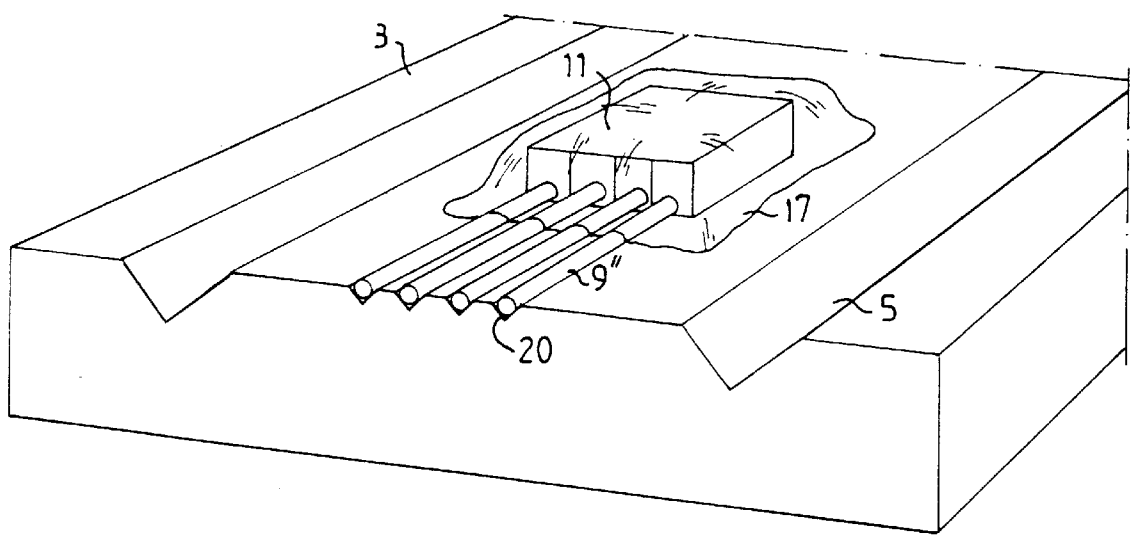
FIG. 2b is a perspective view of a segment of a substrate comprising an interior encapsulation of a component arranged thereupon and waveguides in the form of discrete optical fibers.

The waveguides 9 can also be of a discrete nature and such a construction is illustrated by the perspective view of the front portion of the silicon substrate 3 in FIG. 2b. In this embodiment guide grooves are produced in the surface of the silicon substrate 3 and they are located centrally between and in parallel with the guide grooves 5 for the guide pins and thus perpendicularly to the front edge 6. The guide grooves 20 extend up to the front surface or engagement surface of the silicon substrate 3. The guide grooves 20 for the waveguides can have the same general cross section as the guide grooves 5 for the guide pins but having generally much smaller dimensions and they can also be produced by masking and etching. The waveguides here comprise segments 9" of optical fibers, for instance silica fibers, but plastics fibers can also be used with a good result, depending on the short length of the fiber pieces 9". The optical component 11 itself and its connection region to the interior ends of the optical fibers 9", which ends are located inside the finished encapsulated component, are as above covered by molding of a transparent material 17 and mechanically encapsulated with a resistant polymer material 19.

Figure 3:
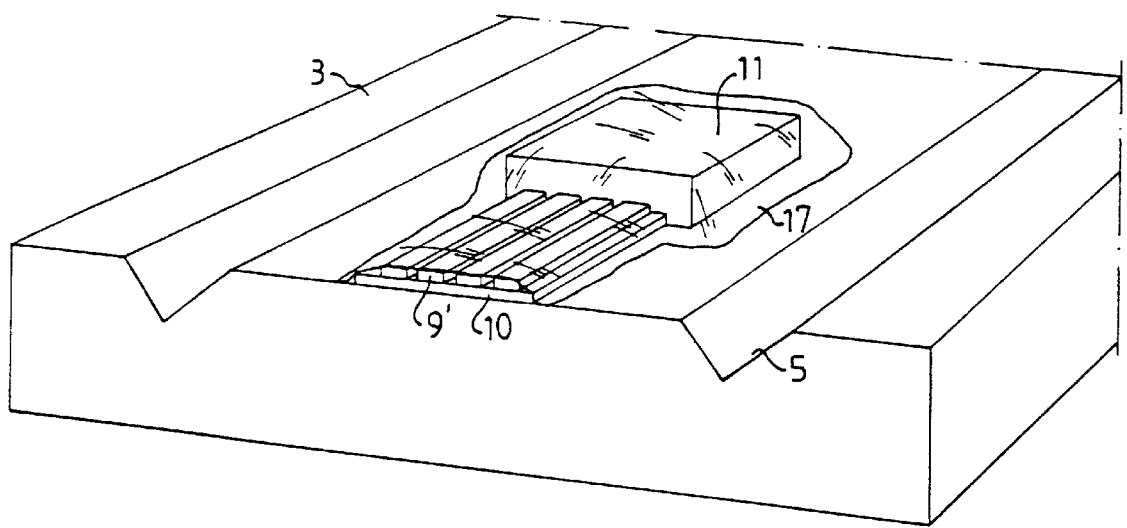
FIG. 3 is a perspective view of a segment of a substrate similar to that of FIG. 2a where the interior encapsulation simultaneously forms a cladding portion of the waveguides.

The waveguides can also be covered entirely by molding of the transparent material, when the waveguides lack a portion of their cladding, which then is formed of this covering, molded transparent material, see the embodiment of FIG. 3. Here is shown as in FIGS. 2a and 2b the front portion of the silicon substrate 3 as viewed in a perspective view obliquely from the front and this embodiment agrees with the embodiment of FIG. 2a except that the upper cladding portion 10 is not there and that it is substituted by a portion of the transparent material 17'. This material layer here extends not only over the optical component 11 itself and its connection region to the waveguide cores 9' and the cladding portion 10 thereof but over the whole free surface of the cores 9' and the lower cladding portion 10. A suitable refractive index is selected for the material 17' so that it can work as a cladding for the cores 9' in order to form complete waveguides. The whole substrate 3 comprising its devices of various kinds located thereupon is as above covered by molding of a mechanically resistant plastics material.

In FIG. 4 an alternative embodiment is illustrated in a perspective view as seen obliquely from the rear side. The silicon substrate 3 is here manufactured as above advantageously and simultaneously with similar substrates of a larger silicon wafer cut or sawed from a single-crystal ingot. By means of anisotropical etching the guide grooves 5 for the guide pins are obtained. A region 10 made of silica, $SiO_2$, having an adapted refractive index is coated by means of conventional methods for producing layers in or on a surface of silicon wafers, such as by means of the PECVD procedure ("Plasma Enhanced Chemical Vapour Deposition"), and forms the lower cladding portion for the waveguides like in FIG. 2a. Strip shaped regions 9' having for instance a rectangular cross section are then arranged on top of this layer of silica material and are given a somewhat higher refractive index in order to form waveguide cores. Then also abutment or positioning bosses (pedestals or mesas) 25 can be made for an accurate positioning of an optoelectronic component 11', which in this embodiment is supposed to be a complete unit comprising its driver electronic circuitry and directly connected to electrical conductive paths 16. They are made on the surfaces of the silicon plate 3 in a suitable way, for instance by coating layers of metal such as Au, Al, by means of conventional procedures and they are connected to exterior electrical conductors, not illustrated in this figure, in the same way as above. The silicon substrate 3 together with its various devices is locally covered by molding of a transparent material, for instance as in FIG. 3, and the complete assembly is covered by molding of a mechanically resistant polymer material.

We claim:

1. A method for the manufacture of an optocomponent, comprising the steps of:
    producing a plate of an inorganic material,
    producing at least portions of waveguides at a surface of the plate,
    mounting an optoelectronic component on said surface of the plate for an optical coupling to the waveguides and for connection to electrical terminals,
    coating at least a portion of the surface of the plate including at least a portion of a free surface of the waveguide portions and a free surface of the optoelectronic component with a first plastics material,
    applying on top of at least an area of the plate covered with the first plastics material a layer of a second plastics material
    wherein the second plastics material has a high mechanical resistance to form a protection of the optoelectronic component and the waveguides and
    the first plastics material has a high elasticity to relieve mechanical stresses resulting from temperature changes.

2. A method according to claim 1, wherein
    the first plastics material is also coated over a region at one end of the waveguides where the waveguides are coupled to the optoelectronic component, and
    the first plastics material is a transparent material having a refracting index to enhance the optical coupling between the component and the waveguide.

3. A method according to claim 1, wherein
    the first plastics material is first coated on top of waveguide portions and
    the first plastics material is a transparent material having an adapted refractive index to form an upper cladding portion of the waveguides.

4. A method for the manufacture of an optocomponent, comprising the steps of:
    producing a plate of an inorganic material,
    producing at least one cladding and at least one core associated said cladding at a surface of the plate for obtaining at least one waveguide, and
    mounting an optoelectronic component on said surface of the plate for optical coupling to the waveguides and for connection to electrical terminals,
    wherein a lower part of said at least one cladding and said at least one core are first produced by process technological methods at a top of a surface of the plate,
    an upper portion of the at least one cladding is produced by covering at least a portion of the surface of the plate including at least a portion of a free surface of the at least one lower cladding and at least a portion of a free surface of the at least one core with a plastics material, and
    wherein at least said surface of the plate including free surfaces of the cladding and the plastics material is coated with an additional plastics layer.

5. A method according to claim 4, wherein for producing at least one waveguide a lower portion of cladding is first produced by coating at least one layer by process technological methods over a selected region on a surface of the plate, as at least one elongated and strip shaped region and subsequently producing at least one core by process technological methods by coating an additional layer having an elongated shape at a surface of the at least one layer which forms the lower portion of the at least one cladding.

6. A method according to claim 4, wherein at least a connection region between the component and at least one waveguide is coated with a plastics material.

7. A method according to claim 6, wherein the plastics material is a transparent material having a refractive index for enhancing the optical coupling between the component and the at least one waveguide.

8. A method for the manufacture of an optocomponent comprising an optical connector means, comprising the steps of:
    producing a plate of an inorganic material,
    producing at least one waveguide at a surface of the plate,
    mounting an optoelectronic component on the surface of the plate for an optical coupling to the waveguides,
    producing accurately aligned guide grooves in the surface of the plate,
    coating at least a connection region between the component and at least one waveguide by molding thereon a transparent material having a selected refractive index to enhance the optical coupling between the component and the at least one waveguide, and
    molding on top of at least an area of the plate where the transparent material is coated a protective plastics layer.

9. A method according to claim 8, wherein a plate of single-crystal silicon is produced and wherein the guide grooves are formed by etching.

10. A method according to claim 8, wherein a plate of single-crystal silicon is produced and wherein at least one waveguide at least partly is produced by process technological methods.

11. A method according to claim 8, wherein at least one of the step of producing the guide grooves and the the step of producing the at least one waveguide includes producing at least one projection on the plate surface for an accurate positioning of the optoelectronic component.

12. A method according to claim 11, wherein a plate of single-crystal silicon is produced and wherein the at least one projection is produced by process technological methods.

13. A method according to claim 8, further comprising the step of disposing alignment devices in the guide grooves for connecting optical contact means to corresponding optical contact means having at least partly the same shape in the guide grooves before the step of molding the plastics layer.

14. A method according to claim 8, wherein at least one waveguide is produced by placing an optical fiber in a guide groove.

15. An encapsulated optocomponent, comprising:
    a substrate of an inorganic material,
    an optoelectronic component mounted to a surface of the substrate optical coupling between the waveguides and for connection to electrical terminals,
    waveguides at least partly formed in and/or on the surface of the substrate, wherein the optoelectric component is optically coupled to the waveguides,
    a first plastics layer of an elastomer material covering at least a portion of the surface of the substrate including at least a portion of a free surface of the waveguides and a free surface of the optoelectronic component and
    a second plastics layer covering at least all of the first plastics layer on the surface of the substrate,
    wherein the material of the second plastics material has a high mechanical resistance to form a protection of the optoelectronic component and the waveguides and the material of the first plastics material is soft and has a high elasticity to relieve mechanical stresses resulting from temperature changes.

16. A method for the manufacture of an optocomponent, comprising the steps of:

producing a plate of an inorganic material, producing at least one cladding and at least one core associated said cladding at a surface of the plate for obtaining at least one waveguide, and mounting an optoelectronic component on said surface of the plate for optical coupling to the waveguides and for connection to electrical terminals, wherein a lower part of said at least one cladding and said at least one core are first produced by process technological methods at a top of a surface of the plate, wherein an upper portion of the at least one cladding is produced by covering at least a portion of the surface of the plate including at least a portion of a free surface of the at least one lower cladding and at least a portion of a free surface of the at least one core with a plastics material, wherein at least a connection region between the component and at least one waveguide is coated with a plastics material, and wherein the plastics material is a transparent material having a refractive index for enhancing the optical coupling between the component and the at least one waveguide.

17. A method according to claim 16, wherein for producing at least one waveguide a lower portion of cladding is first produced by coating at least one layer by process technological methods over a selected region on a surface of the plate, as at least one elongated and strip shaped region and subsequently producing at least one core by process technological methods by coating an additional layer having an elongated shape at a surface of the at least one layer which forms the lower portion of the at least one cladding.

18. A method according to claim 16, further comprising the step of coating at least said surface of the plate including free surfaces of the cladding and the plastics material with an additional plastics layer.

* * * * *

UNITED STATES PATENT AND TRADEMARK OFFICE
CERTIFICATE OF CORRECTION

PATENT NO. : 5,818,990
DATED : October 6, 1998
INVENTOR(S) : Odd Steijer et al.

It is certified that error appears in the above-indentified patent and that said Letters Patent is hereby corrected as shown below:

Column 4, line 4, delete "4" and insert --4a-- after "FIG.".

Column 4, line 5, delete the period and insert -- ; and -- after "capsule".

Figure 4A:
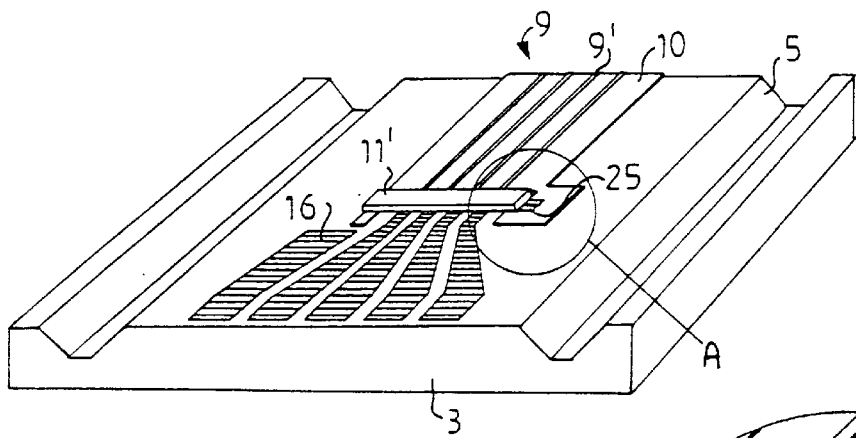
FIG. 4 is a perspective view as seen obliquely from behind of a substrate to be used in an optoelectronic capsule.
Figure 4B:
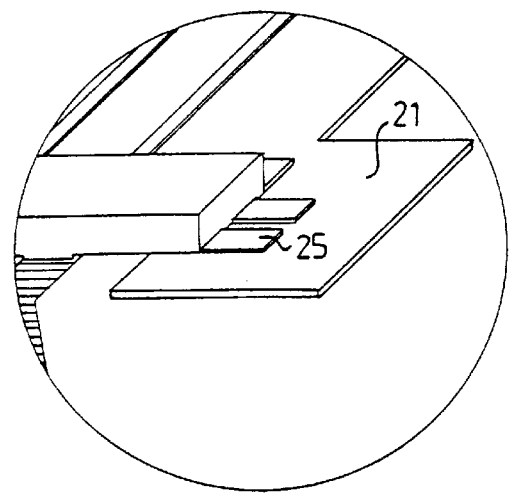

Column 4, between lines 5 and 6, insert -- Fig. 4b illustrates in enlarged view the portion marked "A" in FIG. 4a --.

Column 6, line 37, delete "4" and insert -- 4a -- after "FIG.".

Column 6, line 53, insert -- , which are shown enlarged in FIG. 4b, -- after "25".

Signed and Sealed this

Third Day of August, 1999

Attest:

Q. TODD DICKINSON

*Attesting Officer*   *Acting Commissioner of Patents and Trademarks*